United States Patent [19]
Hitchcock et al.

[11] Patent Number: 4,840,607
[45] Date of Patent: Jun. 20, 1989

[54] PULLEY FOR POLY-V BELT

[75] Inventors: Gary L. Hitchcock, Rochester, Mich.; Henry W. Thomey, Windsor, Canada; Yahya Hodjat, Utica, Mich.; Marc R. Cadarette; Dawson M. Collins, both of Windsor, Canada

[73] Assignee: Dyneer Corporation, Scotsdale, Ariz.

[21] Appl. No.: 67,621

[22] Filed: Jun. 26, 1987

[51] Int. Cl.$^4$ .............................................. F16H 7/02
[52] U.S. Cl. ..................................... 474/167; 474/168
[58] Field of Search .............................. 474/167–170, 474/153, 238; 72/82–84; 29/159 R

[56] References Cited

U.S. PATENT DOCUMENTS

| | | | |
|---|---|---|---|
| 2,060,322 | 11/1936 | Johnson | 474/167 |
| 2,458,396 | 1/1949 | MacGregor | 474/167 |
| 2,471,969 | 5/1949 | Meyer | 474/167 X |
| 2,728,239 | 12/1955 | Adams, Jr. | 74/229 |
| 2,746,308 | 5/1956 | Adams, Jr. | 74/233 |
| 3,404,577 | 10/1968 | Zahn | 474/167 X |
| 3,523,461 | 8/1970 | Nemecek et al. | 474/238 X |
| 3,977,264 | 8/1976 | Sproul | 474/170 |
| 4,031,761 | 6/1977 | Fisher et al. | 474/170 X |
| 4,273,547 | 6/1981 | Bytzek | 474/170 X |
| 4,518,374 | 5/1985 | Kanemitsu | 474/168 |
| 4,551,122 | 11/1985 | Kraft et al. | 474/170 |

FOREIGN PATENT DOCUMENTS

| | | | |
|---|---|---|---|
| 3224303 | 1/1983 | Fed. Rep. of Germany | 474/167 |
| 0005562 | 1/1983 | Japan | 474/167 |

Primary Examiner—Thuy M. Bui
Attorney, Agent, or Firm—Michael Sand Co.

[57] ABSTRACT

A weight reduced pulley for "K" type poly-v belt systems includes a body having an outer cylindrical surface. A plurality of raised ribs extend from said surface and run circumferentially around said surface. A plurality of trough areas are positioned between the ribs. The ribs and troughs corresponding to the location of indented and raised areas, respectively, on a poly-v belt. The ribs have a cross sectional profile extending radially traverse of the axis of rotation of the pulley, each rib being bounded by a pair of planar side walls at relative angles of 40°+0.5°. The side walls terminate in a 140° arc having a radius of 0.5 mm, the outermost point of said arc terminating 0.96 mm inward of the intersection of the upward projections of the planar side walls or apex. The planar side walls extend radially inward at least 3.44 mm from said apex. The trough areas are bounded by the outer cylindrical surface of said pulley, said surface being 3.57 mm from said apex. The outer cylindrical surface is flattened in cross section in said trough areas and a fillet having a radius from 0.25 to 0.35 mm forms a transition between said planar side walls and said flattened surfaces. The pulley incorporates a mounting plate and has an inner cylindrical surface concentric with said outer surface. The inner cylindrical surface extends from the mounting plate to an open periphery. For a pulley having an effective diameter of 150 mm, the thickness of the pulley between the outer cylindrical surface and the inner cylindrical surface is 1.14 mm. In an alternative embodiment, the inner cylindrical surface alternative embodiment, the inner cylindrical surface is tapered towards the open periphery so that for a similar 150 mm pulley, the thickness varies from 1.14 mm adjacent the mounting plate to 0.89 mm adjacent the open periphery.

The pulley is manufactured by concurrently compressing and impressing a can-like blank of hot rolled low carbon steel material with spin forming tools which impress in said material the rib and trough profiles of the pulley.

14 Claims, 7 Drawing Sheets

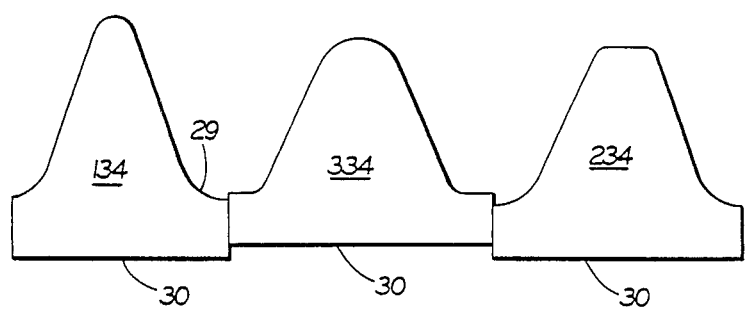
FIG. 11
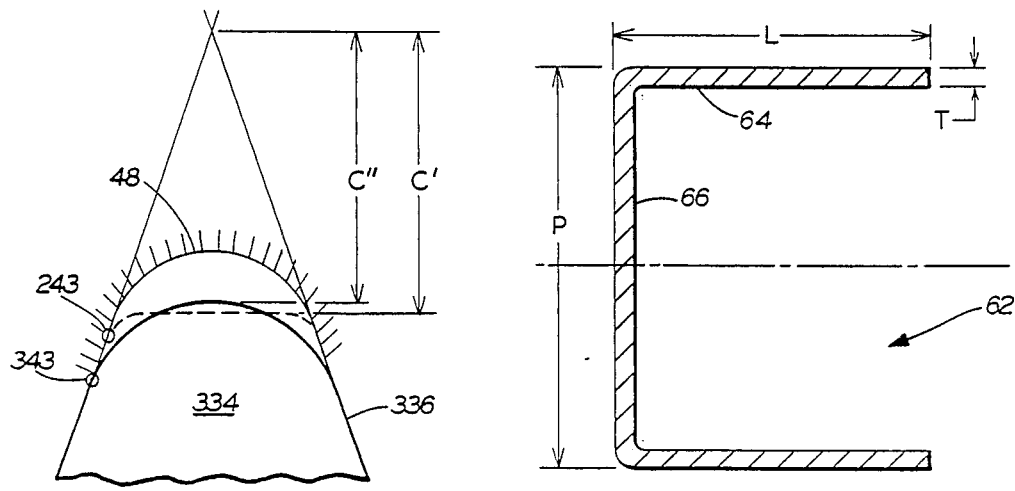
FIG. 12
FIG. 13

PULLEY FOR POLY-V BELT

TECHNICAL FIELD

The present invention relates to power transmission systems which employ poly-v belts. Particularly, this invention relates to weight reduced poly-v pulleys which provide superior power transmission characteristics and methods for manufacturing such pulleys, and to an improved automotive belt drive system for vehicle accessories using such a belt.

BACKGROUND ART

Poly-v belt power transmission systems are well known in the prior art. Such systems are used extensively in automotive applications. Poly-v belts have a plurality of raised and indented areas which run longitudinally and parallel along the belt. There are three types of poly-v belts sold commercially. These are "K" type, the "J" type and the "L" type. The "K" type poly-v belt is generally used in automotive applications.

The Society for Automotive Engineers (SAE) has developed standard profiles for pulleys which are used for driving "K" type poly-v belts. The standard is designated the J1459 standard. The SAE standard actually specifies two profiles, a "full" profile and "truncated" profile. The latter may be used to minimize the material content and weight of a poly-v pulley while still maintaining suitable power transmission characteristics.

Poly-v pulleys designed for automotive applications are generally made from hot rolled low carbon steel. The pulleys are formed by spin forming processes. Examples of pulleys and the processes by which they are made are shown in U.S. Pat. Nos. 4,551,122 and 4,273,547. Spin forming processes are well suited for making such pulleys because the pulleys can be made light in weight, which is particularly important in automotive applications where reduced rotational inertia is desired to improve fuel economy. Also, spin forming enables making such pulleys quickly and at a lower cost than other methods of manufacture.

Thus there exists a need for a poly-v pulley which is lower in weight than conventional pulleys and which has power transmission qualities comparable or greater than prior designs and which can be produced at a lower cost.

DISCLOSURE OF THE INVENTION

It is an object of the present invention to provide a pulley for use in a poly-v belt power transmission system which is lower in weight and material content than prior designs, and which is less expensive than existing pulleys without any reduction in quality or operating efficiency.

It is a further object of the present invention to provide a material reduced poly-v pulley which can be mass produced by conventional spin forming techniques.

It is a further object of the present invention to provide a poly-v pulley which has improved power transmission qualities, and to an improved automotive belt drive system for vehicle accessories using such a pulley.

Further objects of the invention will be made apparent in the attached description of the preferred embodiment and the appended claims.

The foregoing objects are accomplished by a spin formed, sheet metal pulley preferably for driving "K" type poly-v belts. The pulley has a cylindrical body including concentric inner and outer cylindrical surfaces. The body also includes a mounting base at one end for mounting the pulley to a shaft or other member and an open periphery at the end opposite the mounting base.

The outer cylindrical surface has thereon a plurality of raised ribs running circumferentially around said pulley and positioned to correspond to the indented areas of a poly-v belt. Spaced between said ribs on the pulley are trough areas corresponding to the raised areas on a poly-v belt. The ribs extend outward, traverse to the axis of rotation of the pulley. Each rib has a cross sectional profile bounded by a pair of planar side walls positioned at an angle of approximately 40° relative to each other which correspond with the profile of a side wall of the raised area of the poly-v belt. The planar side walls of each rib profile are terminated in a 140° arc having a radius of 0.50 mm. The uppermost point of the arc is positioned 0.96 mm in the radial direction below the point at which upward projections of the planar side walls intersect. This point of intersection determines the apex diameter of the pulley and is called the apex.

In the improved pulley of the present invention, the planar side walls of the rib profiles preferably extend 3.44 mm in the radial direction below the apex. The trough areas extend down 3.57 mm in the radial direction from the apex and terminate in flat bottom surfaces at the outer cylindrical surface of the pulley. The transition between the planar side walls and the flat trough bottoms is accomplished by a fillet having a radius of 0.25 to 0.35 mm.

In an alternative embodiment the thickness of the pulley wall between the inner and outer cylindrical surfaces varies from the base to the open periphery. Near the mounting base, the wall is thickest having a distance from the bottom of the trough to the inner surface of 1.14 mm. This provides for the greatest material thickness in the area of greatest loading. The pulley side wall is tapered toward the open periphery such that the thickness under the trough adjacent the open periphery is 0.89 mm which is sufficient for carrying the load in that area.

The pulleys of both embodiments are manufactured by spin forming a "can-shaped" blank by compressing the material in a groove formation area along the side wall of the blank and concurrently impressing in said area the contour of the ribs and troughs. In the alternative embodiment tapering the inner cylindrical surface is simultaneously accomplished.

BRIEF DESCRIPTION OF THE DRAWINGS

Preferred embodiments of the invention, both product and method illustrative, of the best modes in which applicants have contemplated applying the principles, are set forth in the following description and are shown in the drawings and are particularly and distinctly pointed out and set forth in the appended claims.

FIG. 11 is a split sectional view showing a pulley rib of the present invention in contrast to ribs manufactured to SAE full height and truncated standards;

FIG. 12 is a cross-sectional view of a rib of a pulley of the preferred embodiment engaging a poly-v belt with a prior art SAE truncated rib shown in phantom;

FIG. 13 is a cross-sectional view of a blank from which a poly-v pulley of the preferred embodiment of the present invention is fabricated;

Similar numerals refer to similar parts throughout the drawings.

BEST MODE FOR CARRYING OUT THE INVENTION

Figure 1:
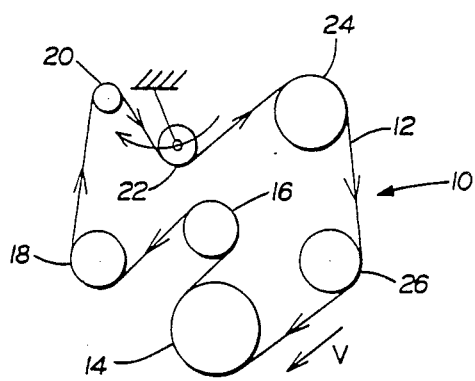
FIG. 1 is a diagrammatic view of a typical poly-v belt system in which the pulley of the preferred embodiment of the present invention may be used.

Referring now to the drawings and particularly to FIG. 1, there is shown therein a schematic view of a power transmission system employing a poly-v belt generally indicated 10. System 10 typifies the type of system that may be found in automotive applications. A poly-v belt 12 travels around pulleys 14, 16, 18, 20, 22, 24 and 26 in the apparatus may be such things as a power steering pump, alternator, air conditioning compressor, or air pump for pollution control devices.

Figure 2A:
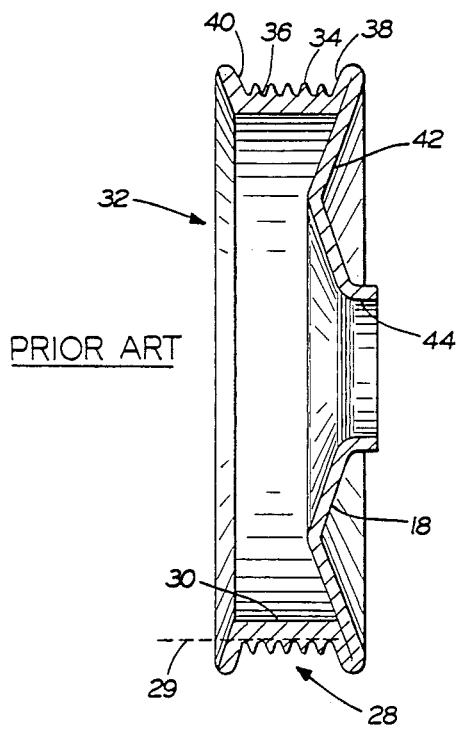
FIG. 2A is a cross-sectional view of a poly-v pulley of the type known in the prior art.

FIG. 2A shows a prior art pulley 18 in cross section. Pulley 18 is typical of conventional pulleys used in automotive applications. It includes a belt contact area generally indicated 28 on which a poly-v belt rides. Pulley 18 has a cylindrical shape including an outer cylindrical surface 29 and an inner cylindrical surface 30. The inner cylindrical surface has an open periphery 32. On the outer cylindrical surface are a plurality of projecting ribs 34 which are separated by open trough areas 36. The five ribs shown are suitable for use with a belt having six raised areas which is the type used in automotive applications. The pulley also has a front flange 38 and a rear flange 40. The flanges are desirable for assuring that the belt remains on the belt contact area 28 of the pulley but such flanges are not required in many applications. Pulley 18 also incorporates a mounting plate 42 at the closed end opposite the open periphery. Mounting plate 42 incorporates a hole 44 which may be used for mounting the pulley on a shaft. Pulley 18 is preferably made from hot rolled, low carbon steel by spin forming techniques such as those described in U.S. Pat. No. 4,551,122 owned by the Assignee of the present invention.

Figure 2B:
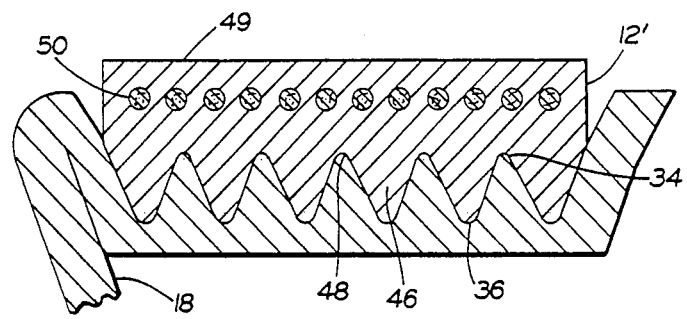
FIG. 2B is a cross-sectional view of a poly-v belt and pulley of the type known in the prior art.
Figure 4:
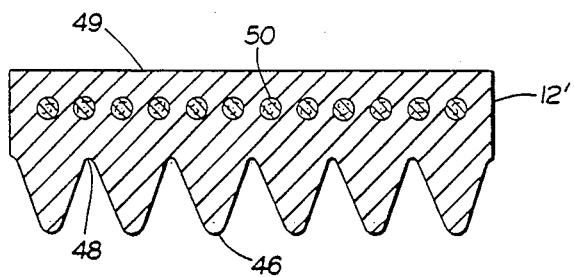
FIG. 4 is a cross-sectional view of a full depth poly-v belt.

FIG. 2B shows pulley 18 in contact with a poly-v belt 12'. Belt 12' is a poly-v belt of early manufacture and is not typical of poly-v belts presently in general use as hereinafter explained. Belt 12' has a plurality of longitudinally raised areas 46 which correspond to trough areas 36 on pulley 18 and a plurality of indented areas 48 which correspond to the position of pulley ribs 34. The belt has a flat top 49. The belt also incorporates a plurality of cords 50 to enhance its longitudinal strength (FIG. 4).

Figure 3:
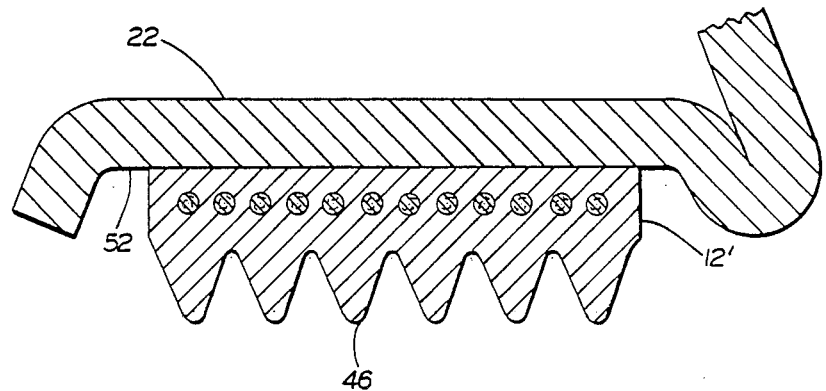
FIG. 3 is a cross-sectional view of a tensioning pulley and a poly-v belt.

Poly-v belts of the design of belt 12' are no longer in general use in automotive applications. This is because in such applications it is common to bend poly-v belts "backwards" around tensioning pulleys such as pulley 22 in FIG. 1. FIG. 3 shows pulley 22 in cross section with belt 12' wrapped backwards on it. Tensioning pulley 22 has a flat belt engaging surface 52 which engages flat top 49 of the belt. As shown in FIG. 3, when belt 12' is bent backward around pulley 22, the raised areas 46 are stretched in tension. As the raised areas 46 of belt 12' have the least material, the raised areas are prone to cracking which eventually causes material to "chunk" out of the raised areas destroying the belt.

Figure 5:
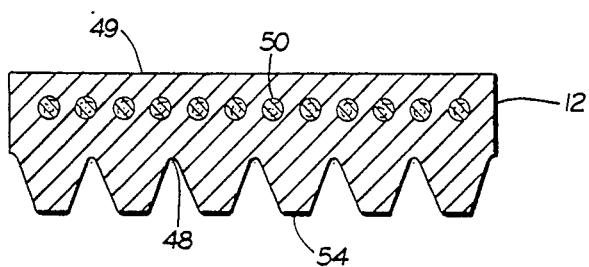
FIG. 5 is a cross-sectional view of a truncated poly-v belt.
Figure 6:
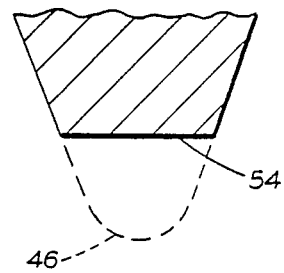
FIG. 6 is a cross-sectional view of a raised area of a truncated poly-v belt with a raised area of a full depth belt shown in phantom.

In order to reduce the problems of cracking caused by backward bending of poly-v belts, a truncated belt design shown in FIG. 5 has been adopted. Such truncated belts are manufactured by several companies including The Goodyear Tire & Rubber Company, Gates and Dayco. Belt 12 of the truncated design has indented areas 48, a flat top 49, and cords 50 similar to belt 12'. Belt 12 however has raised areas that terminate in flattened surfaces 54. For a "K" type poly-v belt of the original design shown in FIG. 4, raised areas 46 extend approximately 3.45 mm from the deepest portion of the indented areas 48. For the truncated poly-v belt shown in FIG. 5, flattened surfaces 54 extend only 2.54 mm from the deepest portion of the indented areas. The differences in the raised area of belts 12 and 12' is shown in FIG. 6 wherein a raised area of belt 12 is shown in cross section with a similar section of belt 12' shown in phantom. The truncation of the raised areas reduces the stress in the outermost fibers of the belt as it is bent backwards thus prolonging belt life.

Figure 8:
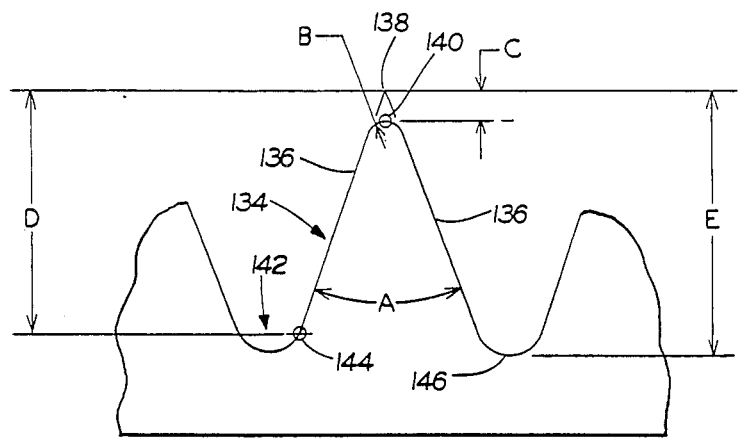
FIG. 8 is a cross-sectional view of a full height pulley rib manufactured to SAE standard.

Interchangeability of poly-v belts made by various manufacturers has been achieved due to conformity of the manufacturers of poly-v pulleys to standards set by the Society of Automotive Engineers (SAE). The standard for poly-v pulleys is known as the SAE J1459 Standard. This standard specifies that the ribs for "K" type poly-v type pulleys (such as ribs 34 of pulley 18) are to be on a spacing of 3.56±0.05 mm centerline to centerline. The standard also specifies two profiles for pulley ribs. FIG. 8 shows the SAE standard for full height ribs in cross section. The full height rib generally designated 134, has a profile bounded by two planar side walls 136. Planar side walls 136 extend outward from the axis of rotation of the pulley and at a relative angle A. Angle A is specified by the SAE standard as 40° with a tolerance of ±0.5°. The upper projections of planar side walls 136 meet at an intersection 138 called an apex. The distance from the centerline of the pulley to the apex 138 is the apex radius of the pulley. Apex 138 serves as a reference point for the dimensions of ribs 134. Planar side walls 136 terminate below the apex in a radius B. Radius B is specified by the standard as 0.25 mm minimum. An uppermost point 140 of radius B is a distance C below the apex in the radial direction. Point 140 is set by the SAE standard at 0.48 mm minimum below the apex.

Between ribs 134 of the pulley are trough areas generally indicated 142. Planar side walls 136 extend into the trough areas to a point 144 which is a distance D from the apex. Point 144 is set by the SAE standard for full rib pulleys at a minimum of 3.60 mm. Trough areas 142 extend further below point 144 in a rounded fashion to a deepest point 146 (on the outer cylindrical surface of the pulley) which is a distance E below the apex. Again, distance E is set by the standard and is 3.93 mm when the radius of trough area 142, indicated at 142A is 0.50 mm.

Figure 9:
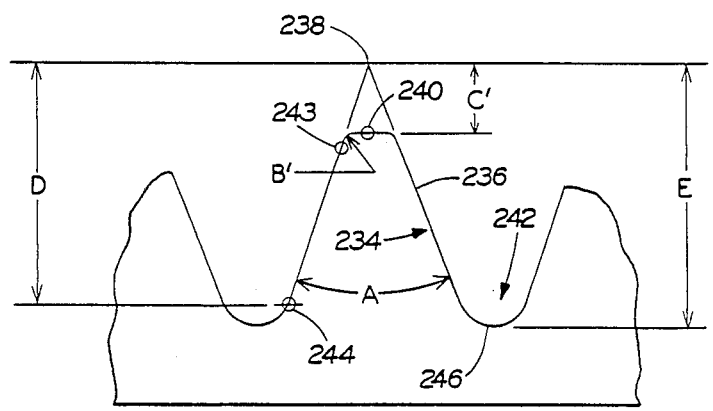
FIG. 9 is a cross-sectional view of a truncated pulley rib manufactured to SAE standard.

The SAE J1459 standard also specifies a truncated rib configuration for "K" type poly-v pulleys, the profile for which is shown in FIG. 9. This truncated rib is specified as a rib which can be used to minimize the material content of a pulley. A rib of the truncated SAE design generally designated 234 includes a pair of planar side walls 236 which are at a relative angle A which is specified by the SAE standard as 40°±0.5°. Projections of planar side walls 236 intersect at an intersection 238 or apex similar to that for the full height rib. Rib 234 has an uppermost surface 240 which is a flattened surface a distance C' below apex 238 which is set by the standard at 0.99 mm. A transition from surface 240 to side walls 236 is made by a radius B' which is again set by the standard at 0.25 mm minimum. Radius B' meets planar side walls 236 at a point 243. The position of point 243 is calculated from the standard at 1.154 mm below the apex.

Between ribs 234 of the pulleys are trough areas generally indicated 242. Side walls 236 extend into trough areas 242 to a point 244 which is a distance D in the radial direction below apex 238. Trough areas 242 are rounded below point 244 and extend to a point 246 which is a distance E below the apex. As in the case for full height SAE rib 144, distance D is specified as a minimum 3.60 mm and distance E is specified as 3.93 mm.

Figure 10:
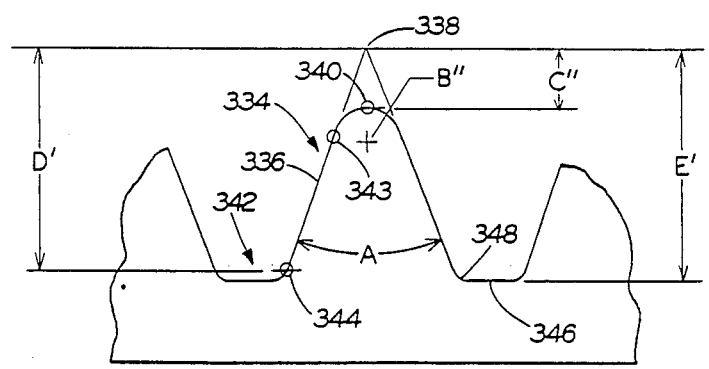
FIG. 10 is a cross-sectional view of a pulley rib of a pulley of the preferred embodiment of the present invention.

The new rib and groove configuration of the preferred embodiment of the present invention is shown in FIG. 10. Applicants' rib profile generally indicated 334 is bounded by a pair of planar side walls 336 which are set at a relative angle A which is 40°±0.5° similar to the ribs of pulleys made to SAE standards. Outward projections of planar side walls 336 intersect at an apex 338. Planar side walls 336 terminate in a 140° arc having a radius B''. Radius B'' in the preferred embodiment is 0.50 mm. Radius B'' has an uppermost point 340 which is a distance C'' in the radial direction from apex 338. Distance C'' is preferably 0.96 mm. Radius B'' intersects planar side wall 336 at a point 343 which may be a maximum of 1.29 mm below the apex.

Ribs 334 of the preferred form of the pulley of the present invention are separated by trough areas generally indicated 342. Planar side walls 336 extend into trough areas 342 to a point 344 which is a distance D' below apex 338. In the preferred form of the rib, point 344 is 3.44 mm from the apex. Trough areas 342 extend below point 344 and terminate in a flattened bottom surface 346 which corresponds to the outer cylindrical surface of the pulley. Surface 346 is a distance E' below apex 338, which in the preferred form of the invention is 3.57 mm from the apex. The transition from planar side wall 336 to flattened bottom surface 346 is made by a fillet radius 348 which in the preferred embodiment is a radius from 0.25 to 0.35 mm.

Figure 7:
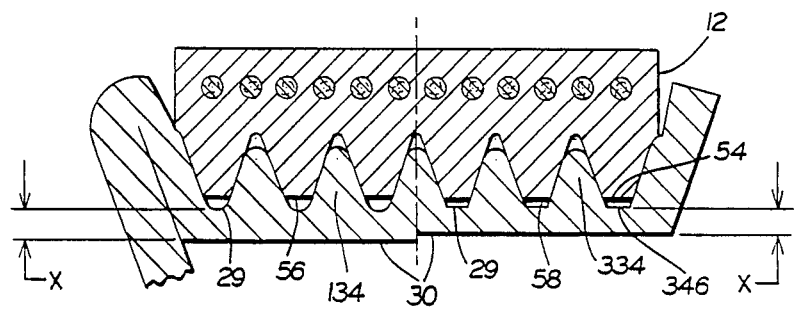
FIG. 7 is a split cross-sectional view of a pulley of the preferred embodiment and a prior art pulley in contact with a truncated poly-v belt.

The significant advantages in weight and material of the preferred embodiment of the present invention is demonstrated in FIG. 7. In FIG. 7, a poly-v pulley made in accordance with SAE full height standard (rib 134) is shown beside the rib design of the preferred embodiment of the present invention (rib 334). It should be noted that there exists unoccupied space in area 56 in the SAE design whereas there is much less space or zero space in corresponding areas 58 of the pulley design of the present invention especially after a short period of usage wherein the belt is "worn in" materially reducing or completely eliminating space 58. After only a relatively short period of usage, flattened surfaces 54 of belt 12 will engage flattened bottom surfaces 346 of the improved pulley design. Likewise, in applicants' design, inner cylindrical surface 30 has been moved outward. It should be noted however that the thickness of the cross section labeled X in FIG. 7 is comparable for both pulleys. By maintaining between the inner and outer cylindrical surfaces 29 and 30, respectively, a thickness comparable with standard SAE pulleys, the preferred embodiment achieves strength that is comparable to prior art pulleys while substantially decreasing the amount of material used.

The rib profile of the pulley of the present invention is shown side by side with the SAE full height and truncated profiles in FIG. 11. For a pulley where the diameter is 150 mm (approximately 6 inches) which is popular in automotive applications, and a material thickness from the lowest point in the troughs to the inside of the pulley, i.e., the distance from outer cylindrical surface 29 to inner cylindrical surface 30, of 1.14 mm, which is desirable in most automotive applications, the volumes of material for a single pulley rib of each pulley type are set forth in the following table.

TABLE I

| | VOLUME (mm) | DIFFERENCE IN VOLUME (mm) | PERCENT REDUCED |
|---|---|---|---|
| SAE Standard Rib | 4514.04 | — | — |
| SAE Truncated Rib | 4387.77 | 126.27 | 2.80 |
| Present Invention | 3738.58 | 765.46 | 16.96 |

Thus it is shown that for a 150 mm diameter pulley, applicants' design achieves an almost 17% reduction in material content from the full height SAE design and and a reduction of approximately 14.5% over the SAE truncated design. This savings is achieved even though applicants' pulley has an inside diameter 0.702 greater than the SAE designs for a 150 mm pulley.

A comparison of the rib of a pulley of the preferred form of the present invention to a rib made in accordance with the SAE J1459 standard for truncated pulley ribs, is shown in FIG. 12. Rib 334 of the pulley of the present invention is shown in profile with the SAE profile shown in phantom. Indented area 48 of poly-v belt 12 is shown over said ribs. Planar side walls of the rib of the present invention contact side walls of the belt at a point 343, whereas for the SAE pulley, the belt contacts the side wall at a point 243. Thus, the SAE truncated pulley is in contact with the belt for an additional distance between points 243 and 343. This additional distance is approximately 0.145 mm at the top of each rib. As the additional contact is at the top on each side of the rib and because the length of planar side wall in contact with the belt is longer for the SAE standard pulley, one would expect the SAE pulley to exhibit greater power transmission capability than the pulley of the present invention.

Figure 15:
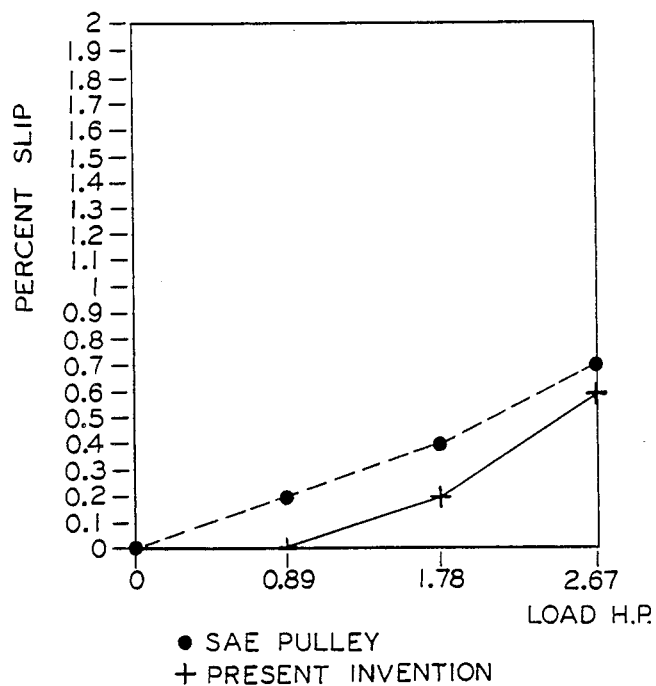
FIG. 15 is a graph of the relationship of horsepower transmitted to slip using a new belt, for a poly-v pulley of the present invention and prior art pulleys designed to SAE standards.

Although one might expect that pulleys designed in accordance with the present invention would have less power transmission capability compared to SAE pulleys, experimentation has shown that the opposite is true. FIG. 15 graphically shows how belt slip for a 150 mm pulley of the present invention varies with increasing loads. This data is shown as a solid line. Similar slip to power transmission relationships for an SAE pulley is shown as a dashed line. The data in FIG. 15 was collected using a new belt. The percentage slip of the pulley of the present invention is less than that of the SAE pulley in the range below 2.7 horsepower. It should be noted that with a new belt, slip is substantially less in the lower horsepower ranges which is the range of interest for automotive applications.

Figure 16:
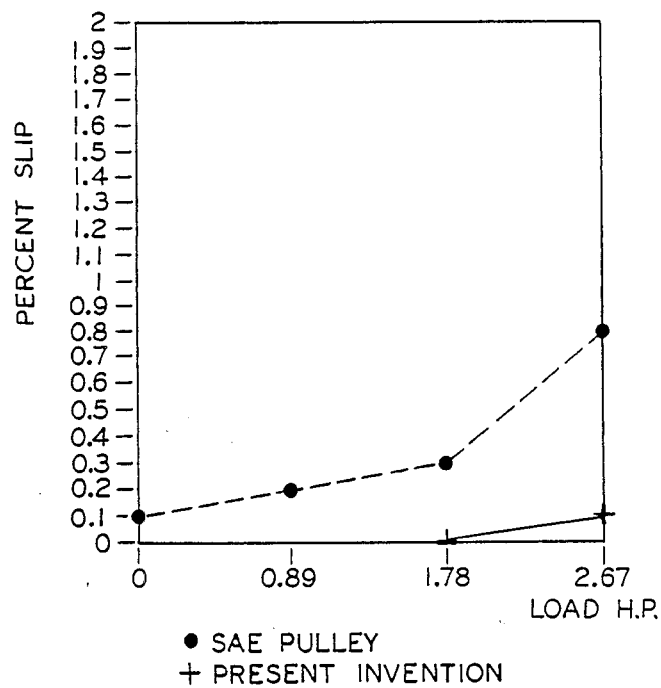
FIG. 16 is a graph of the relationship of horsepower transmitted to slip using a broken in belt, for a poly-v pulley of the present invention and prior art pulleys designed to SAE standards.

In FIG. 16 a similar comparative data is shown, however in that case, a worn belt was used. For worn belts, the pulley of the present invention presents an even greater power transmission advantage over SAE pulleys at all loads in the indicated range.

The pulley of the present invention is preferably manufactured by a spin forming process. Spin forming processes are well known for the making of sheet metal poly-v pulleys. The making of a pulley begins by drawing or otherwise forming a can shaped blank 62 shown in cross section in FIG. 13. Blank 62 has cylindrical legs 64 and a face 66. Legs 64 are formed into the ribs and flanges of the pulley and face 66 becomes the mounting plate.

The process for forming a pulley of the preferred embodiment from blank 62 is similar to that described in U.S. Pat. No. 4,273,547. Legs 64 are concurrently compressed and impressed by spin forming tools, the faces of which tools are a reverse image of the profile the pulley takes as a result of the forming process. The diameter of blank 62, the length of legs 64, and the thickness of the blank, labeled P, L and T, respectively, in FIG. 13, are compared in Table II below for the various blanks used in manufacturing pulleys of 150 mm diameter, made according to the SAE standards and the preferred embodiment of the present invention.

TABLE II

| (mm) | P (mm) | L (mm) | T |
|---|---|---|---|
| SAE full rib | 155.36 | 38.84 | 2.3 |
| SAE truncated rib | 155.36 | 38.99 | 2.2 |
| Present invention | 155.36 | 38.71 | 1.9 |

Thus manufacture of the pulley of the present invention requires a considerably thinner blank than the other pulleys as would be expected with its lower weight and required material content.

Figure 14A:
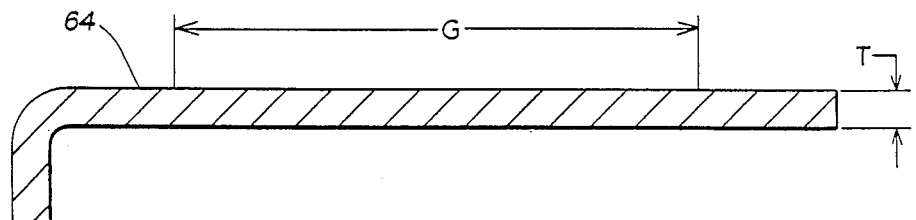
FIGS. 14A and 14B show a groove formation area of the blank of FIG. 13 in which the ribs and troughs are formed before and after such forming has occurred respectively.
Figure 14B:
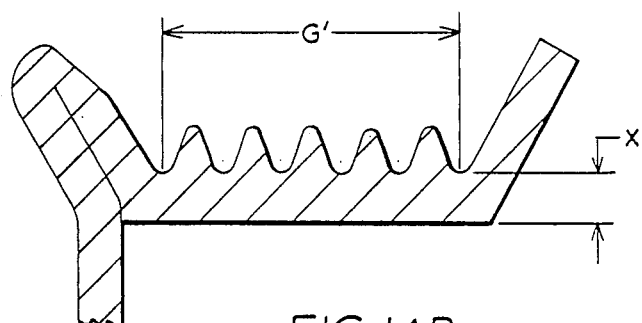
Figure 17:
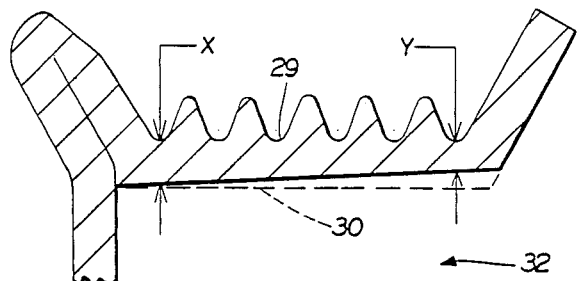
FIG. 17 shows a further weight reduced alternative embodiment of the pulley of the present invention.

In manufacturing a pulley of the preferred embodiment, having an effective diameter of 150 mm, a portion of the material in leg 64 is compressed and thickened to form the ribs 334 and trough areas 342. The material which actually forms the ribs and troughs is a groove formation area. The length of legs 64 required for the five ribs and six trough areas necessary to accommodate a "K" type poly-v belt having six raised areas is labeled G in FIG. 14A. For the preferred form of the invention, area G is 20.35 mm in length. The compression and spin forming process causes the material in area G to be worked into the form G' shown in FIG. 14B. In the preferred form of the invention G' is 17.8 mm long and thickness X, which is the material thickness between the lowermost portion of the trough areas and the inner cylindrical surface is 1.14 mm. An alternative design for the pulley of the present invention is shown in FIG. 17. In the alternative embodiment, further reduction in weight and material content is achieved by tapering the inner cylindrical surface 30 such that it is thinner adjacent open periphery 32. The savings achieved by tapering the inner surface is graphically demonstrated by a straight inner cylindrical surface which is shown in phantom in FIG. 17. Applicants have determined that by maintaining the thickness X required to carry the load of the pulley near mounting plate 42, overall pulley strength is retained. The tapered inner surface reduces the thickness Y under the last groove. Applicants have found that for a 150 mm diameter pulley of the preferred embodiment, X is ideally 1.14 mm and Y is 0.89 mm and that the taper is linear.

It has also been determined that the improved grooved pulley of the invention has superior resistance to hydroplaning, that is, when a pulley, and in particular the power steering pulley, is flooded with water, the belt momentarily hydroplanes or slips on the pulley causing the driver loss of power steering. The amount of time from the moment the hydroplaning starts to when it is finished is cut in half with the improved pulley groove of the invention in comparison with the standard SAE pulley groove configuration. This advantage is believed to be achieved since flattened surfaces 54 of belt 12 will engage flattened bottom surfaces 346 of the improved pulley and squeeze the water from therebetween (FIG. 7).

Another advantage of the invention is that with conventional SAE grooves, the belt eventually wears into the pulley grooves causing the pulley ribs to protrude closer to the belt cords. The improved pulley groove configuration dramatically impedes this wearing problem that occurs in the poly-v belt.

Thus, the new poly-v pulley of the present invention achieves the above stated objectives, eliminates difficulties encountered in the use of prior devices, solves problems and obtains the desirable results described herein.

In the foregoing description, certain terms have been used for brevity, clarity and understanding, however no unnecessary limitations are to be implied therefrom because such terms are used for descriptive purposes and are intended to be broadly construed.

Moreover, the description and illustrations given are by way of examples, and the invention is not limited to the exact details shown or described.

Having described the features, discoveries, and principles of the invention, the manner in which it is utilized, and the advantages and useful results obtained, the new and useful structures, devices, elements, arrangements, parts, combinations, systems, equipment, operations, methods, and relationships are set forth in the appended claims.

What is claimed is:

1. A pulley for transmitting power to or from an adjacent "K" type poly-v belt, said belt having alternatively raised and indented areas running in parallel longitudinally on said belt, comprising:
(a) a body including an outer cylindrical surface;
(b) a plurality of raised ribs extending from said outer surface, said ribs running circumferentially about said surface and corresponding with the indented areas of said belt;
(c) a plurality of trough areas between said ribs in correspondence with the raised areas of said belt;
(d) said ribs extending radially traverse of the axis of rotation of said pulley, each of said ribs in cross section bounded by a pair of planar side walls at relative angles of 40°±0.5° and terminating in a 140° arc having a radius of 0.50 mm, an outermost point of said arc 0.96 mm below a point of intersection of projections of said side walls, and said side walls extending at least 3.44 mm in the traverse direction inward of said point of intersection.

2. The pulley according to claim 1 wherein said outer cylindrical surface is 3.57 mm inward in the traverse direction of said point of intersection and said surface is flat in cross section in said trough areas.

3. The pulley according to claim 2 wherein said body includes a mounting plate and an inner cylindrical surface concentric with said outer cylindrical surface, said inner cylindrical surface extending from said mounting plate to an open periphery.

4. The pulley according to claim 3 wherein the thickness of said pulley between said outer and inner cylindrical surfaces in the radial direction is at least 1.14 mm adjacent said mounting plate.

5. The pulley according to claim 4 wherein said inner cylindrical surface is tapered and said distance between said inner and outer cylindrical surfaces is reduced adjacent said open periphery.

6. The pulley according to claim 5 wherein the thickness of said pulley between said outer and inner cylindrical surfaces in the radial direction is at least 0.89 mm adjacent said open periphery.

7. The pulley according to claim 2 and further comprising a fillet having a radius from 0.25 to 0.35 mm between said planar side walls and said outer cylindrical surface.

8. The pulley according to claim 6 wherein said pulley is of low carbon steel material.

9. A pulley for transmitting power to or from an adjacent a multi-groove "K" type poly-v belt, said belt having alternatively raised and indented areas running in parallel longitudinally on said belt, said pulley being made from a cylindrical blank of low carbon steel, said blank including a cylindrical side wall including a groove formation area, said groove formation area having in cross section a 1.91 mm thickness and a 20.35 mm length, said pulley made by a process comprising the steps of:
(a) compressing said groove formation area to a length of 17.8 mm; and
(b) concurrently with said compressing spin forming said groove formation area by working said area with a plurality of spin forming rolls, said spin forming rolls impressing in said areas, multiple ribs projecting traversely of said longitudinally axis of said blank, said ribs corresponding with said indented areas of said belt, and multiple trough areas corresponding with said raised areas of said belt; each rib in cross section bounded by a pair of planar side walls at relative angles of 40°±0.5° and terminating in a 140° arc having a radius of 0.50 mm, an outermost point of said arc 0.96 mm below a point of intersection of projections of said side walls, said side walls extending at least 3.44 mm in the radial direction inward of said point of intersection.

10. The pulley according to claim 9 wherein said spin forming rolls impress said trough areas such that said troughs terminate at an outer surface of said pulley 3.57 mm inward in the radial direction of said point of intersection and said outer surface is flat in cross section between said planar side walls.

11. The pulley according to claim 10 wherein said pulley is formed with an inner cylindrical surface, said groove formation area having a thickness after forming of 1.14 mm between said inner and outer cylindrical surfaces.

12. The pulley according to claim 11 and further comprising a mounting plate, said pulley further made by tapering the thickness of said groove formation area between said inner and outer cylindrical surfaces from 1.14 mm adjacent said mounting plate to 0.89 mm at a point in said groove formation area farthest from said mounting plate.

13. The pulley according to claim 9 wherein said pulley is formed with five ribs and six trough areas.

14. An improved automotive belt drive system for vehicle accessories including:
(a) a poly-v belt having alternatively raised and indented areas running in parallel longitudinally on said belt, said raised areas terminating in flattened surfaces and said indented areas terminating in concavely curved surfaces; and
(b) a pulley engaged with the belt for transmitting power to and from said belt, said pulley having a body with an outer cylindrical surface and a plurality of raised ribs extending from said outer surface and running circumferentially about the surface and extending into the indented areas of the belt, each of said ribs being separated by a flattened area which engages the flattened surface of the raised areas of the belt only after a short period of usage, said ribs terminating in convexly curved spaces which terminate and remain in a spaced relationship from the concavely curved surfaces of the indented areas of the belt even after contact of the flattened surfaces of the raised areas of the belt and the flattened areas of the pulley.

* * * * *